Oct. 28, 1941.    M. G. NELSEN    2,260,680
TRAFFIC SIGNALING DEVICE FOR VEHICLES
Filed Feb. 5, 1940    2 Sheets-Sheet 1
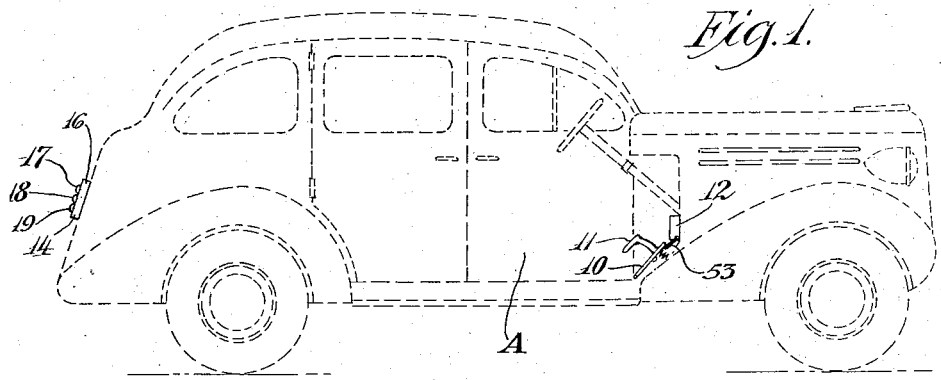
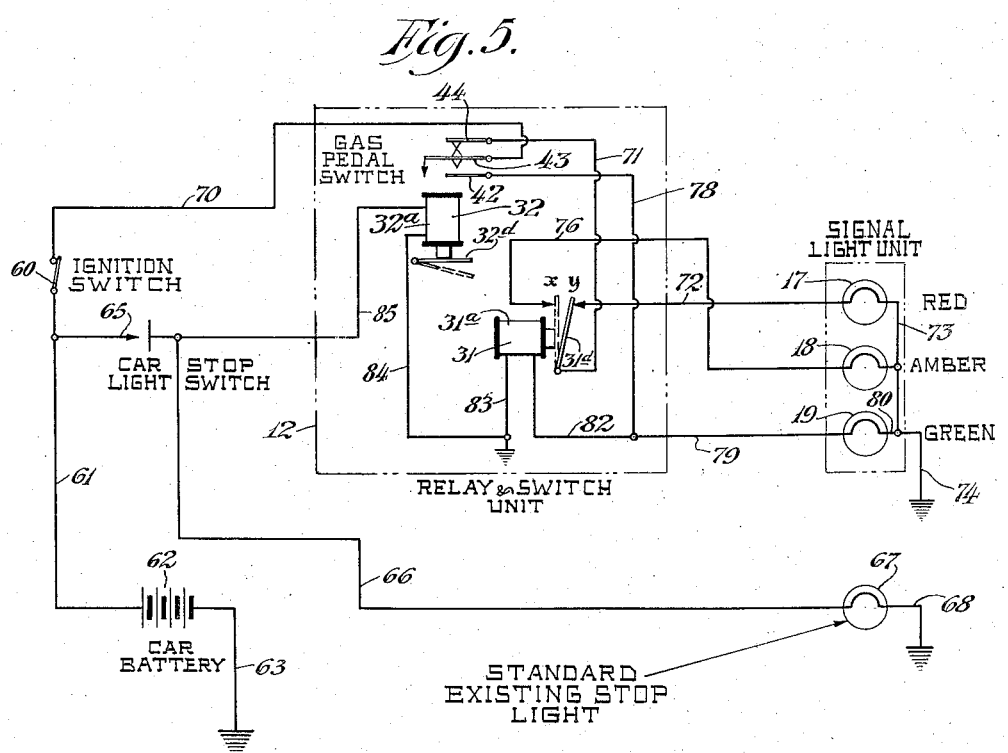

Oct. 28, 1941.                M. G. NELSEN                2,260,680
TRAFFIC SIGNALING DEVICE FOR VEHICLES
Filed Feb. 5, 1940                2 Sheets-Sheet 2
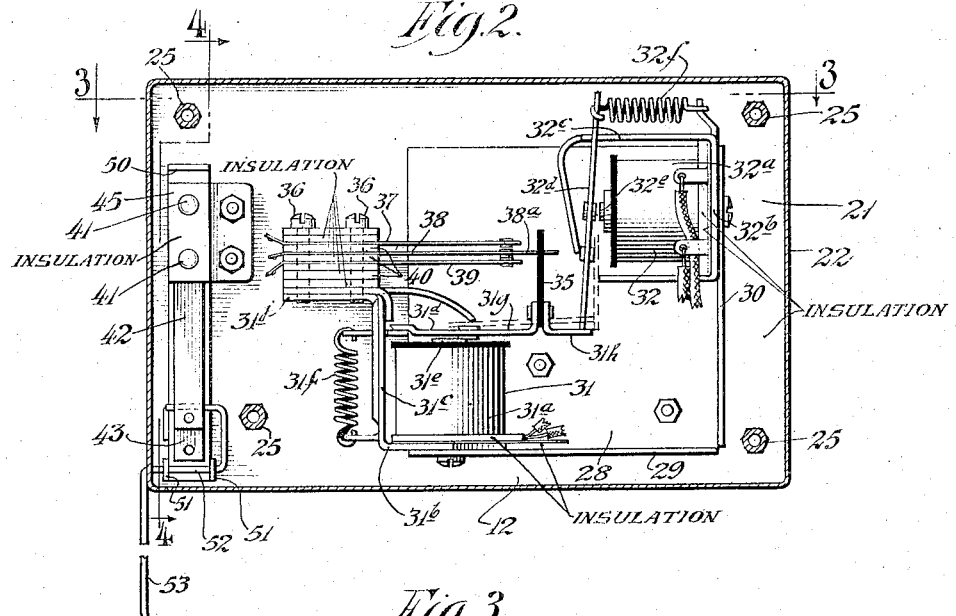
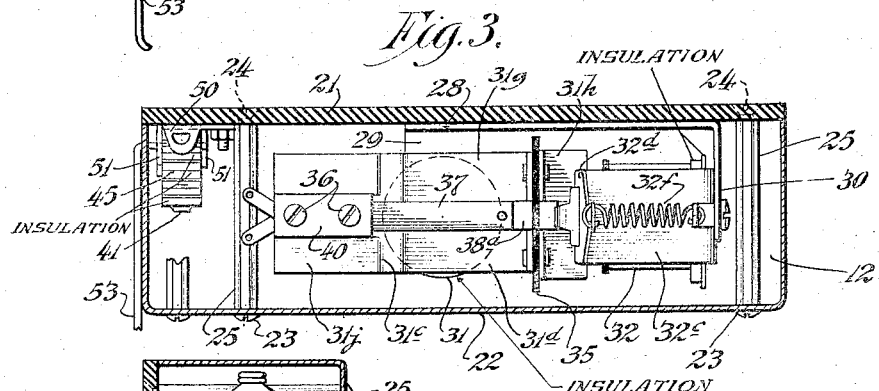
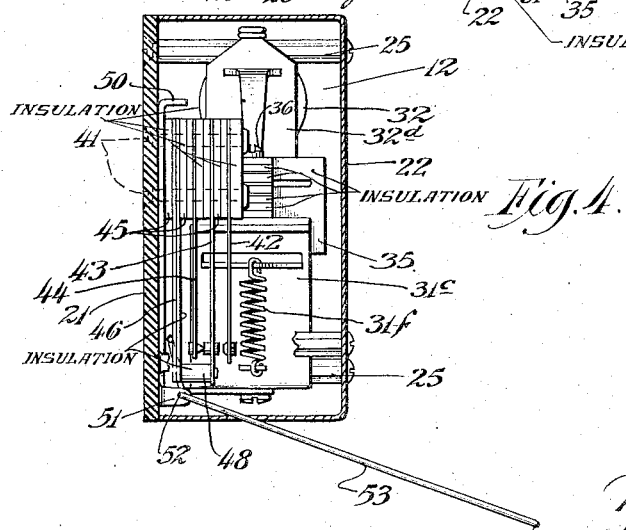
Inventor:
Marvin G. Nelsen
By Bair & Freeman
Attorneys Patented Oct. 28, 1941

2,260,680

UNITED STATES PATENT OFFICE 2,260,680

TRAFFIC SIGNALING DEVICE FOR VEHICLES

Marvin G. Nelsen, Chicago, Ill., assignor of one-half to Frank F. Rowell, Sr., Chicago, Ill.

Application February 5, 1940, Serial No. 317,376

9 Claims. (Cl. 177—339)

The present invention relates to signaling apparatus for use in connection with vehicles such as automobiles, trucks, busses, street cars and trains, and more particularly to signaling devices of the type for providing visual signal indications at the rear end of a vehicle for informing drivers or pilots of following vehicles of the condition or state of motion of the vehicle containing the signaling device.

It is recognized that various types of signaling devices of this general character have heretofore been devised, such as the type including a red light at the rear end of the vehicle, and which is operated by application of the vehicle brakes. However, such signaling devices have been found inadequate in that they do not properly and fully inform the driver or pilot of the following vehicle of the state of motion of the vehicle carrying the signaling device.

In certain localities it has been common practice, while in others it is mandatory by ordinance or statute, that the driver of a vehicle give a warning, by means of moving or positioning of the arm of the driver, to following vehicles of an intent to maneuver the vehicle in a certain manner. It is recognized that the use of the hand or arm as a means for signaling the driver of following vehicles is almost an impossibility in vehicles of certain types and, in many instances, is wholly ineffective such as, for example, at night time on streets or highways that are insufficiently illuminated. It is also recognized that in congested communities, such as large cities, as well as on certain highways carrying heavy traffic, the problem of drivers in keeping their vehicles under proper control to avoid collision with preceding vehicles is extremely difficult due to the inadequacy of arm signaling, and present-day signaling devices and systems.

The primary object of the present invention is to provide a novel and improved signaling apparatus, including signal indicating means on the rear end of a vehicle, having visual illuminated signal lights corresponding substantially in color to the signal lights generally employed for regulating traffic on streets and highways, wherein a green light is a signal for movement of the vehicle or traffic, an amber light is a caution or signal to slow down the speed of a vehicle, and a red light is a positive warning or a signal to stop the vehicle.

Another object is to provide an improved signaling apparatus of the character indicated, constructed so to give visual signal indications to drivers of following vehicles—wherein such signal indications correspond to well-known and established road signaling systems—to indicate a condition or state of motion of a vehicle, such as a state of acceleration or movement at a relatively uniform rate of speed, slowing down, or positive retardation or stoppage of the vehicle so as to permit the driver of a following vehicle to be readily advised with respect to the condition or state of motion of the preceding vehicle and thereby tend to avoid accidents and collisions therewith.

A further object of this invention is to provide an improved signaling device which is automatic insofar as the driver of the vehicle is concerned, and by virtue of which visual signal indications at the rear end of the vehicle indicate respectively, a state of acceleration or movement at a relatively uniform rate of speed, slowing down, or positive retardation or stoppage of the vehicle, and thereby clearly inform drivers of following vehicles in regard to the condition or state of motion of the vehicle carrying such signals.

Still another object of this invention is to provide an improved signaling apparatus of the character indicated including electrically illuminated signal elements for indicating accelerated or uniform movement of a vehicle, deceleration of the vehicle, or positive retardation or stoppage of the vehicle, and wherein said electrically illuminated elements are connected in parallel with the ignition circuit of the vehicle so as to be rendered capable of operation only when the vehicle is in condition for movement.

A still further object of this invention is to provide an improved signaling system of the character indicated which is relatively simple in construction, positive in operation, inexpensive to manufacture and install, and adapted to be readily embodied in a vehicle in initial manufacture or to be applied to existing vehicles in the nature of accessory devices.

Other objects and advantages of this invention will be apparent from the following description, taken in connection with the accompanying drawings, in which:

Figure 1 is a view in side elevation of a passenger automotive vehicle in dotted outline, with parts of the signaling apparatus constituting the present invention shown in a relative position thereon;

Figure 2 is a plan view, with the top of the cover broken away, of the relay and switch unit constituting the control for my novel signaling apparatus;

Figures 3 and 4 are sectional views of the relay and switch unit, taken substantially as indicated respectively at lines 3—3 and 4—4 on Figure 2 of the drawings, and Figure 5 is a schematic view of the wiring diagram including the electrical circuits of the signaling system comprising the present invention.

For purpose of illustration I have shown, and as will be hereinafter described, an adaptation of my novel signaling system in connection with an automotive vehicle, but it is to be understood, however, that the signaling system comprising the present invention is adapted to a relatively wide field of use in connection with various types of vehicles, as above mentioned.

In Figure 1 of the drawings I have shown an automobile indicated in dotted outline and designated at A, provided with a conventional foot type accelerator pedal 10, and a brake pedal 11 in association with the inclined portion of the dashboard of the vehicle. Mounted for convenience on the upright portion of said dashboard, above the accelerator pedal, is a unit 12 housing the relay and switch units for controlling a signaling device indicated at 14, mounted on the rear end of the vehicle. It is to be understood that the signaling device may be mounted on the vehicle in any suitable manner, such as by attachment to the license plate bracket, or by direct securement to a portion of the body of the vehicle.

The signaling device is provided with a housing 16 which serves as a closure or cover, for three spaced-apart electric light bulbs, indicated at 17, 18 and 19 which, in themselves, may be colored to designate the colors red, amber and green, respectively, or the housing may and desirably is formed with apertures in registration with conventional light bulbs, and wherein said apertures are covered by proper colored lenses or transparent lenses with which are associated proper coloring matter to give signal light indications of red, amber and green. While I have selected the colors red, amber and green so as to correspond with the color of light signals used in connection with traffic lights on highways and street intersections for controlling vehicular traffic, manifestly, if desired, other colored light indications may be employed or some suitable physically moving signal may be substituted in lieu of said lights.

However, since certain colored signal lights now commonly employed for regulation of traffic, have more or less become standard for indicating definite signals to drivers of vehicles, I prefer to use similar colored lights to avoid confusion and because such colored lights have acquired an accepted and uniform meaning.

In the signaling system embodying the present invention the foot accelerator pedal 10 when operated controls electrical circuits for the green and amber signal lights 19 and 18 respectively depending upon the position of adjustment of said pedal 10, while operation of the brake pedal 11 controls the electrical circuit for the red signal light 17.

The unit 12 mounted on the dashboard includes a mounting base 21 of insulating material which serves as a mounting panel for relays and switches for controlling the electrical circuits and which relays and switches are enclosed by a cover element 22, preferably formed of sheet metal, and which in turn is secured to the mounting base 21 by means of screws 23 and 24 extending through the top of the cover and through the mounting panel 21, in engagement with the threaded ends of the tubular spacer posts 25.

Secured to the mounting panel 21 is a mounting bracket 28, in the form of a sheet metal stamping, having a pair of upstanding legs 29 and 30 disposed in right angular relation to each other, as seen in Figure 2 of the drawings, and which legs serve as mountings for relay devices indicated at 31 and 32 respectively. Said relays are of generally similar construction, including respectively coils 31$^a$ and 32$^a$, field pieces 31$^b$ and 32$^b$ provided with angular leg portions 31$^c$ and 32$^c$, to outer ends of which are hingedly mounted armatures 31$^d$ and 32$^d$, normally urged in a direction away from the cores 31$^e$ and 32$^e$ of said relays, by means of coil springs 31$^f$ and 32$^f$.

The arrangement of the relays is such as to provide an interlocking relationship with respect to the armatures thereof by virtue of which the armature of one relay, when the coil of the relay is energized is caused to move into engagement with its core, and is locked in such position by the armature of the other relay. In other words, when the armature of one of the relays is attracted to its core, the armature of the other relay becomes disposed in such relationship to the armature of the first mentioned relay as to hold the latter armature substantially in contact with its core, and restraining movement thereof to normally inoperative position under influence of its spring. It is necessary to first energize the core of the other relay to cause attraction of its armature to its core, in order that the armature of said first-mentioned relay is again free to move to normal position under influence of its spring, and when said armature is permitted to return to normal position, it locks the armature of the second mentioned relay in position, attracted to the core of the coil of its own relay.

For convenience, the armature 31$^d$ of relay 31 is formed of two pieces of metal indicated at 31$^g$ and 31$^h$, the adjacent ends of which are provided with corresponding flange portions between which flanges is riveted a panel 35 of insulating material. The leg portion 31$^c$ of the field piece of the relay 31 terminates at its free end in a rearwardly extending shelf portion 31$^j$ on which is mounted, by means of screws 36, a switch device composed of flexible switch fingers 37, 38 and 39 which are mounted in separated relation by means of insulating blocks 40 on said shelf portion 31$^j$. The free ends of the switch fingers are formed with contact buttons and are disposed in substantially parallel aligned relation, and the intermediate switch finger 38 includes an extension 38$^a$ projecting into an aperture or slot formed in the panel 35 of insulating material. By virtue of this arrangement, it will be apparent that when the armature 31$^d$ of relay 31 is attracted to the core of its coil, as seen in Figure 2, the switch finger 38 is drawn downwardly, due to the movement of the panel 35 with the armature 31$^d$ so as to make contact of switch fingers 38 and 39, and when said armature 31$^d$ is moved to its free or inoperative position under the influence of its spring 31$^f$, which occurs when relay 32 is energized, attracting its armature 32$^d$ to its coil, the panel 35 imparts movement to the switch finger 38 so as to break the contact between switch fingers 38 and 39 and make contact between switch fingers 38 and 37.

The relays 31 and 32 together with the switch structure described are not truly represented in the wiring diagram shown in Figure 5, but are shown in said diagram in a manner to simplify the establishment of electrical circuits in the operation of the signaling apparatus. In other words, the armature 31$^d$ of relay 31, as shown in the wiring diagram, is movable to either of two positions of adjustment, indicated at X and Y, and at which positions the armature results in completing portions of two separate branch portions of the electrical circuit, corresponding to making or breaking of circuits by switch finger 38 with the switch fingers 39 and 37.

Also mounted on the base panel 21, by means of screws 41, is a switch assembly including conductor fingers 42, 43 and 44 disposed in parallel spaced-apart aligned relation with corresponding ends thereof secured between blocks of insulating material as indicated at 45. A resilient control finger 46 is disposed below the bank of flexible switch fingers 42, 43 and 44 in substantially parallel relation therewith. Said switch fingers are provided with contact buttons and the intermediate switch finger 43 is normally positioned in contact with switch finger 44 as seen in Figure 4. Mounted on the outer end of switch finger 43 is a plug 48 of insulating material positioned to seat upon the outer end of the control finger 46, and mounted below the switch assembly is a stamping 50 having a pair of spaced-apart upright ears 51 disposed forwardly of the ends of the bank of switch fingers, in which ears is swively mounted a bail member 52. One end of said bail is bent rearwardly and disposed beneath the resilient control finger 46 as seen in Figure 4 of the drawings, and the other end of said bail member continues into a relatively long arm 53, the extreme end portion of which, when the assembly or unit 12 is mounted in an upright position on the dash, as shown in Figure 1 of the drawings, extends beneath the accelerator pedal 10. It will now be apparent that when the accelerator pedal is in its elevated position corresponding to the idling condition of the automobile engine, the arm 53 is in the position seen in Figure 4, at which time switch fingers 43—44 are in contact, and when the accelerator pedal is depressed, movement is imparted to the arm 53 which, through the extension 50 of the bail member, raises the resilient control finger 46, and through the medium of the insulating plug 45 moves switch finger 43 out of contact with the switch finger 44 and into contact with switch finger 42, for completing a different branch circuit of the electric signaling system.

In the wiring diagram illustrated in Figure 5, it will be noted that the electric circuits constituting the signaling system of the present invention are connected in parallel with the ignition circuit of the engine of the automobile with the ignition switch indicated at 60, from which a conductor wire 61 is connected to one pole of the battery 62, and a conductor wire 63 connects the other pole to ground, which is the vehicle chassis.

It is to be understood that operation of the brake pedal 11 closes a switch, as indicated at 65, which switch it may be understood is the same commonly employed at present times for existing stop lights of most present-day automotive vehicles and which, as shown in the drawings, includes a conductor wire 66 to a terminal of a stop signal light 67, the other terminal of which is connected by conductor 68 to the ground. Insofar as the present invention is concerned, the existing stop signal light 67 together with conductor wires 66 and 68 may, if desired, be dispensed with.

The electric circuits for the respective signal lights 17, 18 and 19 which, as above mentioned, are connected in parallel with the ignition system, and include a conductor wire 70 connecting the stationary terminal of the ignition switch 60 to the switch finger 43, which switch finger is part of the switch unit controlled by the arm 53 subject to control by movement of the accelerator pedal 10. Switch finger 44 is connected by a conductor wire 71 to the armature 31$^d$ of the armature 31, which armature is adapted to assume either of two circuit making positions of adjustment, as above mentioned, and which for convenience are indicated in the wiring diagram at X and Y respectively. As seen in Figure 5 the armature 31$^d$ is in engagement with contact Y, which is connected by a conductor wire 72 to one terminal of the red signal light 17, the other terminal of said light being connected by conductor wire 73 to a conductor wire 74 which in turn is connected to the ground. The other contact X is connected by a conductor wire 76 to one terminal of the amber signal light 18, the other terminal of said light being connected by a conductor wire 73 to the conductor wire 74 and thence to the ground. The other switch finger 42 is connected by conductor wire 78 to a conductor wire 79 which is connected to one terminal of the green signal light 19, the other terminal of the light being connected by a conductor wire 80 to the conductor wire 74 and thence to the ground.

A conductor wire 82 connects conductor wire 79 to one terminal of the coil of relay 31, the other terminal of the coil being connected by a conductor 83 to the ground. A conductor wire 84 connects one terminal of the coil of relay 32 to the ground, while the other terminal of the coil of said relay 32 is connected by a conductor wire 85 to the stationary terminal of the switch 65, which is actuated by the brake pedal 11.

The operation of the electric circuits of the signaling system may be described as follows: After the ignition switch 60 is closed, current is permitted to flow into conductor wire 70, through switch fingers 43 and 44 and through conductor wire 71 to contact Y and thence through conductor wire 72 to the red signal light 17, from which the conductor wires 73 and 74 complete the circuit to the ground. In other words, when the vehicle is standing still with the ignition switch closed, the red signal light 17 will be energized. In placing the vehicle in motion, as is well understood, it is necessary to accelerate the engine thereof which may be accomplished by depressing the accelerator pedal 10, which action imparts movement to the switch operating arm 53 for breaking contact between switch fingers 43 and 44 and makes contact between switch fingers 42 and 43, in which case the current will then flow from conductor wire 70 through switch fingers 42—43 and conductor wires 78—79 to the green signal light 19 and conductor wires 80 and 74 and thence to ground. As long as the accelerator pedal 10 remains in a partially depressed condition, the switch fingers 42—43 are maintained in circuit-making position so that while the vehicle is accelerating or traveling at an accelerated uniform rate of speed, the green signal light 19 will remain energized. When the circuit is made for energizing the green signal light, current also flows through conductor wire 82, through the coil of relay 31 and back through conductor wire 83 to the ground, thereby energizing the coil of the relay and attracting the armature 31ᵈ to the core of the coil for causing the armature to engage contact X.

As above described, the armatures 31ᵈ and 32ᵈ of the respective relays 31 and 32 are interlocked so that when the armature of one of the relays is attracted to its core, it is locked in such position until released by attraction of the armature of the other relay to its core upon energizing of the coil of said other relay. Therefore, the armature 31ᵈ will remain in the position indicated in dotted lines in Figure 5, engaging contact X until the relay 32 is energized for attracting its armature 32ᵈ to its core.

When pressure is removed from the accelerator pedal 10, the arm 53 is returned to normal position by the action of the spring member 46, thus breaking the circuit connections between switch fingers 42 and 43 and re-establishing circuit connection between switch fingers 43 and 44 by virtue of which current is then caused to flow from conductor wire 70, through the switch fingers 43—44 and conductor wire 71 to the contact X, and conductor wire 76 to the amber signal light 18 which is connected through conductor wire 74 to the ground.

It will now be apparent that while pressure is removed from the accelerator pedal 10, the amber light 18 remains energized and the circuit including the amber signal light 18 remains completed, but just as soon as the accelerator pedal is again depressed, the circuit to the amber light is broken and the circuit to the green signal light 19 is re-established. In other words, when pressure is applied to the accelerator pedal for accelerating motion of the vehicle, a circuit is automatically completed for energizing the green signal light 19 to visually indicate to drivers of following vehicles that the automobile is traveling at an accelerating or uniformly accelerated rate of speed, and when pressure is removed from the foot accelerator 10, the circuit to the green signal light 19 is automatically broken and the circuit to the amber signal light 19 is thereby completed so as to visually indicate to a driver of a following vehicle that the automobile is decelerating or slowing down, and thereby serves as a caution signal to the driver of a following vehicle.

As above mentioned, when pressure on the accelerator pedal is relieved, the amber light 19 is energized, and when the brake pedal is depressed for effecting positive retardation of the vehicle, switch 65 is thereby closed to cause a flow of current through conductor wire 85 to the coil of relay 32 and back through the conductor 84 to the ground, causing energization of the coil of the relay and an attraction of its armature 32ᵈ to the core thereof, as seen in full lines in Figure 5 of the drawings. When the armature 32ᵈ is attracted to its core, due to the interlocking relation as above described, and as shown in Figure 2 of the drawings, the armature 31ᵈ under influence of its spring pressure is released for movement into engagement with contact Y, thus breaking the circuit of the amber light 18, and current is then permitted to flow through conductor wire 70, switch fingers 43—44, conductor wire 71, through the armature 31ᵈ and contact Y, and conductor wire 72 for completing the circuit for the red signal light 17 to ground, which light then positively serves as a warning or a stop signal to the driver of a following vehicle.

If the standard existing stop light 67 is also used in conjunction with my signaling device, it will be apparent when switch 65 is closed incident operation of brake pedal 11, the signal light 67 will be illuminated simultaneously with red signal light 17. But, as above mentioned, when utilizing the above system constituting this invention, the present existing stop light indicated as 67 need not necessarily be employed.

It will be apparent that after the vehicle has been retarded or arrested as a result of application of pressure on the brake pedal 11 and such pressure is released and the foot accelerator 10 again depressed, an electrical circuit will be re-established through the switch members 42—43 for energizing the green signal light 19 and which circuit, as above mentioned, energizes the coil of the relay 31 for moving the armature 31ᵈ from contact Y to contact X, for establishing the circuit for energizing the amber signal light 18, as above described, when pressure is again released from the foot accelerator 10, which corresponds to a decelerating condition of the vehicle.

Although I have herein shown and described a preferred embodiment of my invention, manifestly it is capable of modification and rearrangement of parts without departing from the spirit and scope thereof. I do not, therefore, wish to be understood as limiting this invention to the precise form herein illustrated and described, except as it may be so limited in the appended claims.

I claim:

1. Vehicle signaling apparatus of the character described, comprising indicating means mounted on the rear end of a vehicle and including three separate electrically-operated visual indicating devices to designate respectively an accelerating condition of the vehicle, a decelerating condition of the vehicle, and positive retardation or stopped condition of the vehicle by application of braking pressure, electrical circuits for each of the indicating devices subject to control by a control switch, a source of electrical energy, switch means for selectively completing the electrical circuits for the respective indicating devices and means for operating said switch means in correspondence with and in response to the accelerating, decelerating, positive brake retardation or stopped conditions of the vehicle, for operating the particular indicating device for truly designating the one of the aforementioned existing conditions of the vehicle, said switch means and operating means being constructed for completing the electrical circuit for the indicating device corresponding to positive retardation of the vehicle, during positive retardation of the vehicle, and for maintaining said circuit during the period the vehicle is in stopped condition.

2. Vehicle signaling apparatus of the character described, comprising indicating means mounted on the rear end of a power-driven vehicle and including three separate electrically operated visual indicating devices to designate respectively an accelerating condition of the vehicle, a decelerating condition of the vehicle, and positive retardation, or stopped condition of the vehicle by application of braking pressure, electrical circuits for each of the indicating devices subject to control by a control switch, a source of electrical energy, switch means for selectively completing the electrical circuits for the respective indicating devices, and means for operating said switch means is correspondence with and in response to the accelerating, decelerating, and positive brake retardation or stopped conditions of the vehicle, said switch means and operating means being constructed for completing the electrical circuit for the indicating device corresponding to positive retardation of the vehicle, during positive retardation of the vehicle, and for maintaining said circuit during the period the vehicle is in stopped condition.

3. Signaling apparatus for a vehicle having a movable accelerator member and a brake pedal, said apparatus comprising indicating means mounted on the rear end of the vehicle and including two separate electrically operated visual indicating devices, one to designate an accelerating or uniform motion of the vehicle, the other to designate positive retardation or stopped condition of the vehicle resulting from brake pedal action, electrical circuits for each of the indicating devices, a source of electrical energy, and switch means comprising a switch including an arm positioned to be actuated by movement of the accelerator member for controlling the electrical circuit for said one indicating device, and another switch positioned for actuation by movement of the brake pedal for controlling the electrical circuit for said other indicating device, said switch means including interlocking elements for holding the circuit for said other device closed as a result of brake pedal operation until the circuit for said one device is reestablished by subsequent movement of the accelerator member.

4. Signaling apparatus for a vehicle having a movable accelerator member and a brake pedal, said apparatus comprising indicating means mounted on the rear end of the vehicle and including two separate electrically operated visual indicating devices, one to designate a decelerating condition of the vehicle, the other to designate positive retardation or stopped condition of the vehicle resulting from brake pedal action, electrical circuits for each of the indicating devices, a source of electrical energy, and switch means comprising a switch including an arm positioned to be responsive to movement of the accelerator member for controlling the electrical circuit for said one indicating device, and another switch positioned to be actuated by movement of the brake pedal for controlling the electrical circuit for said other indicating device, said switch means including interlocking elements for holding the circuit for said other device closed as a result of brake pedal operation until the circuit for said one device is re-established by subsequent movement of the accelerator member.

5. Signaling apparatus for an automotive vehicle having a movable accelerator member and a brake pedal, said apparatus comprising indicating means mounted on the rear end of the vehicle and including three separate electrically operated visual indicating devices to designate respectively an accelerating condition of the vehicle, a decelerating condition of the vehicle, and positive retardation or stopped condition of the vehicle by brake pedal action, resulting from operation of said accelerator member or brake pedal, electrical circuits for each of the indicating devices, subject to control by a control switch, a source of electrical energy, and switch means for said circuits including switch devices, a control arm therefor positioned to be actuated in response to movement of the accelerator member, and a switch device operable by the brake pedal, said switch means including interlocking elements for simultaneously rendering the other two of said circuits inoperative upon completion of one of said circuits, whereby the existing condition of the vehicle at a given time resulting from control by said accelerator member and brake pedal automatically completes an electrical circuit for the indicating device corresponding to the particular one of the existing aforementioned conditions of the vehicle, said switch means and interlocking elements being constructed for completing the electrical circuit for the indicating device corresponding to positive retardation or stopped condition of the vehicle, in response to brake pedal action, and also serving to maintain said circuit during the period the vehicle is in stopped condition.

6. Signaling apparatus for an automotive vehicle having a movable accelerator member, a brake pedal and an ignition system including an electrical circuit, a manually operable switch, and a source of electrical energy, said apparatus comprising indicating means mounted on the rear end of the vehicle and including three separate electrically operated visual indicating devices to designate respectively an eccelerating condition of the vehicle, a decelerating condition of the vehicle, and positive retardation or stoppage of the vehicle, resulting from operation of said accelerator member or brake pedal respectively, electrical circuits for each of the indicating devices connected in parallel with the electrical circuit of the ignition system so as to be subject to control of said manually operable switch, and switch means for said circuits including switch devices in series with said manually operable switch, a control arm for said switch devices positioned to be actuated in response to movement of the accelerator member, and a switch device operable by the brake pedal, said switch means including interlocking elements for simultaneously rendering the other two of said circuits inoperative upon completion of one of said circuits, whereby the existing one of the aforementioned conditions of the vehicle at a given time resulting from control by said accelerator member and brake pedal automatically completes an electrical circuit for the indicating device corresponding to the particular one of the existing aforementioned conditions of the vehicle.

7. Vehicle signaling apparatus of the character described comprising indicating means mounted on the rear end of a vehicle and including three separate electrically operated visual indicating devices, two of said devices designating respectively an accelerating condition of the vehicle and a decelerating condition of the vehicle, and the third device indicating positive retardation or stopped condition of the vehicle resulting from application of braking pressure, a movable member for controlling the acceleration of the vehicle, an element for applying braking action to the vehicle, electrical circuits for each indicating device, and switch means for controlling said circuits, said switch means being responsive to opposite movements of the control member for selectively completing the respective circuits for said two indicating devices, said switch means also being responsive to the actuation of said brake applying element for completing the electrical circuit for said third indicating device, said switch means including means for holding said last-mentioned circuit closed until one of the other circuits for said two devices is closed by subsequent movement of the control member.

8. Vehicle signaling apparatus of the character described, comprising indicating means mounted on the rear end of a vehicle and including three separate electrically operated visually indicating devices, two of said devices designating respectively an accelerating condition of the vehicle and a decelerating condition of the vehicle, and the third device indicating positive retardation or stopped condition of the vehicle resulting from application of braking pressure, electrical circuits for each of the indicating devices, a source of electrical energy, switch means for selectively completing the electrical circuits for the respective indicating devices, means for operating said switch means in correspondence with and in response to the accelerating and decelerating conditions of the vehicle for selectively operating either of said two devices, and means for operating said switch means in response to application of brake pressure for operating said third device, said switch means including interlocking control elements for holding the circuit for said third device closed until the circuit for one of the other two devices is closed.

9. Signaling apparatus for an automotive vehicle having a movable accelerator member and a brake pedal, said apparatus comprising indicating means mounted on the rear end of the vehicle and including three separate electrically operated visual indicating devices, two of said devices indicating, respectively, an accelerating condition of the vehicle and a decelerating condition of the vehicle, and the third device indicating positive retardation or stopped condition of the vehicle, electrical circuits for each of said devices, a source of electrical energy, and switch means for said circuits including a control member adapted to be positioned for actuation in response to opposite movements of the accelerator member for controlling, respectively, the electrical circuits for the first two mentioned devices, and a switch device adapted to be positioned to be closed by the movement of the brake pedal for controlling the last mentioned device, said switch means including a relay connected in one of the circuits of the first two mentioned devices having an armature adapted when the relay is energized to complete a portion of the other circuit for the other of said first two mentioned devices, and a second relay connected in the circuit of the last mentioned device, the armatures of said relays being provided with interlocking elements whereby the armatures of the relays are permitted to be attracted to the cores of the relays only upon alternate energization of said relays.

MARVIN G. NELSEN.